United States Patent

Lehmann et al.

[11] Patent Number: 5,143,202
[45] Date of Patent: Sep. 1, 1992

[54] SCREW CONVEYOR

[75] Inventors: Rolf Lehmann, Seon; Reinhold Hodel, Oberentfelden, both of Switzerland

[73] Assignee: K-Tron Technologies, Inc., Wilmington, Del.

[21] Appl. No.: 757,933

[22] Filed: Sep. 12, 1991

[30] Foreign Application Priority Data

Sep. 14, 1990 [CH] Switzerland ............... 2995/90

[51] Int. Cl.⁵ .......................................... B65G 33/00
[52] U.S. Cl. ................................. 198/670; 198/671; 222/413
[58] Field of Search ................ 198/548, 550.1, 670, 198/671; 222/412, 413, 526, 537

[56] References Cited

U.S. PATENT DOCUMENTS

| | | | |
|---|---|---|---|
| 2,630,906 | 3/1953 | Philipp | 198/550.1 |
| 3,570,655 | 3/1971 | Hayashi | 198/670 |
| 4,222,502 | 9/1980 | Gubitose et al. | 198/658 X |

FOREIGN PATENT DOCUMENTS

| | | | |
|---|---|---|---|
| 0057167 | 8/1982 | European Pat. Off. | 222/412 |
| 1148489 | 6/1963 | Fed. Rep. of Germany. | |
| 321358 | 4/1957 | Switzerland. | |

*Primary Examiner*—Robert P. Olszewski
*Assistant Examiner*—Cheryl L. Gastineau
*Attorney, Agent, or Firm*—Oliff & Berridge

[57] ABSTRACT

A screw conveyor with a slowly rotating feed screw for precision metering by conveying very small amounts of loose material between screw threads, the same amount of loose material being discharged from the end of the conveyor with each turn of the screw. During the relatively short time interval of a single revolution, which can last one minute or even a multiple thereof as needed, the conveyor capacity itself fluctuates, since discrete amounts of the material being conveyed are always delimited by the individual threads of the feed screw. In order for a screw conveyor to be usable for precision metering of very small amounts to be conveyed; i.e. for conveying very small amounts with a high degree of constancy without the periodicity caused by the nature of the feed screw, the screw conveyor is provided with a rotatably mounted tube surrounding the discharge end of the fixed feed tube and which is driven at a rotational speed proportional to the rotational speed of screw.

14 Claims, 1 Drawing Sheet

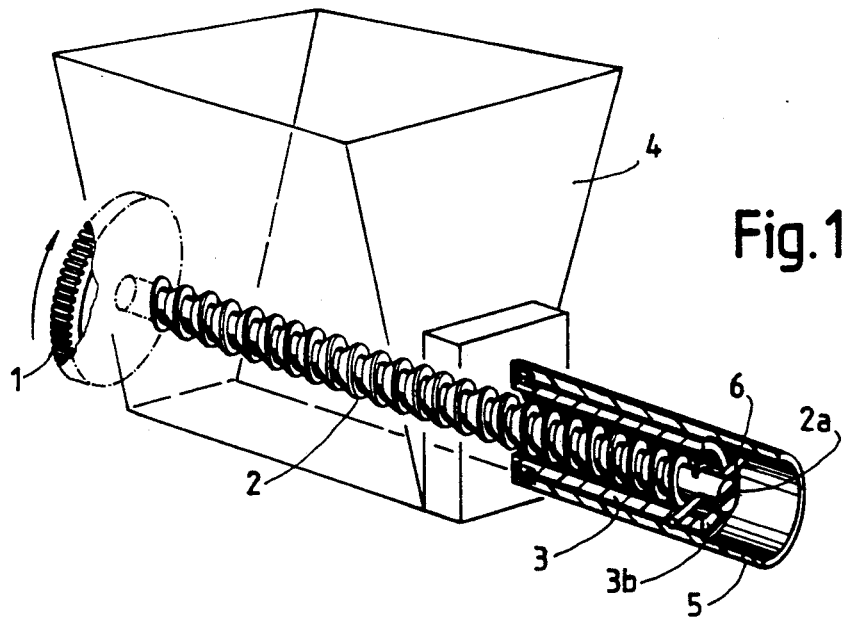
Fig.1
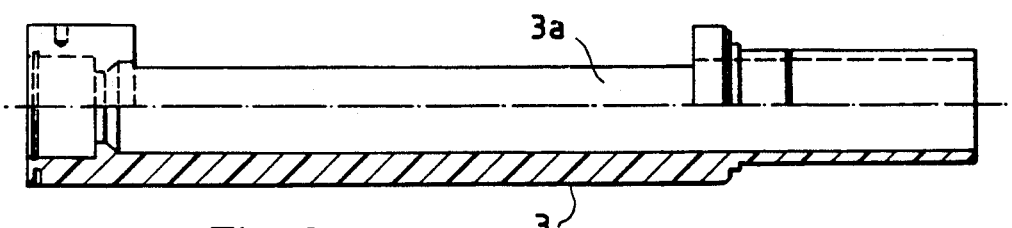
Fig.2
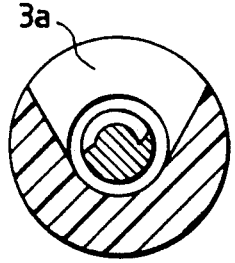
Fig.3
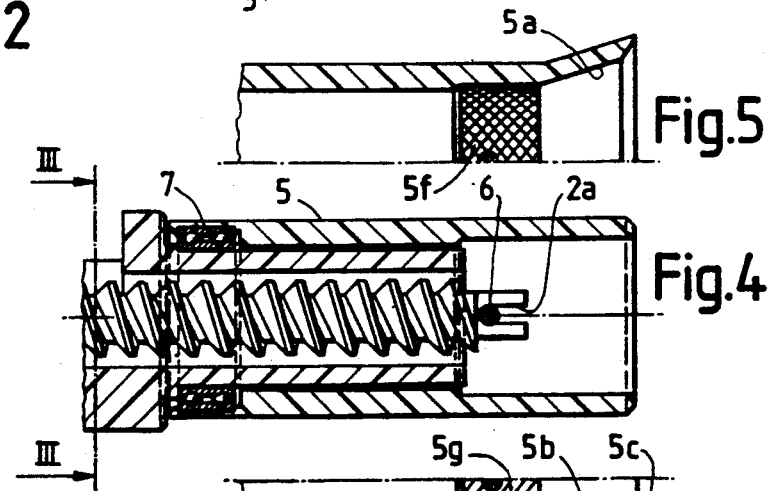
Fig.5
Fig.4
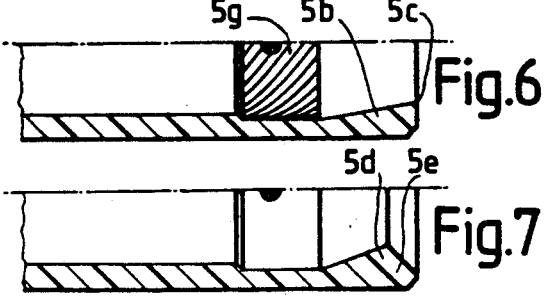
Fig.6
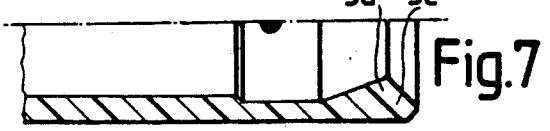
Fig.7

SCREW CONVEYOR

BACKGROUND OF THE INVENTION

A screw conveyor has a feed screw rotatably mounted in a fixed tube. The tube itself is provided at some point with a feed opening of a certain size. A screw conveyor of this type conveys material in the form of dust or granules with a high degree of regularity, so that it can also be used as a metering device. When small amounts are to be conveyed, i.e. on the order of 50 g/hr or approximately 1 g/min, only small amounts of the material to be conveyed are present between two screw threads. This results in a batchwise feed, so that metering is constant over long time intervals but periodic fluctuations of considerable amplitude occur within short intervals, with the result that a screw conveyor cannot be used for fine metering in situations in which a high degree of constancy of the delivery, i.e. the amount of material conveyed per unit time, is required for small amounts to be conveyed not only over long time intervals but also over short time spans as well.

SUMMARY OF THE INVENTION

The screw conveyor with a conveyor screw running at least approximately in the horizontal axis according to the present invention meets these stricter requirements, the conveyor differing from ordinary screw conveyors in that the discharge end of the fixed tube is surrounded by a rotatably mounted tube, the tube being open at one end and driven at a rotational speed proportional to the rotational speed of the screw. "At least approximately in the horizontal axis" in this context means that the axis of the screw runs horizontally or at a maximum angle of 30° to the horizontal. An especially simple design can be produced by connecting the rotatably mounted tube nonrotatably with the screw, so that it rotates with the latter and at the same rotational speed.

BRIEF DESCRIPTION OF THE DRAWINGS

One embodiment of the invention is described below with reference to the attached drawings, wherein:

FIG. 1 is a perspective view of a screw conveyor according to the invention;

FIG. 2 shows a fixed tube, partially in side view, partially in lengthwise section;

FIG. 3 is a section along line III—III in FIG. 4;

FIG. 4 is a lengthwise section through the rotatably mounted tube;

FIGS. 5, 6 and 7 each show a portion of a lengthwise section through a variation of the opening of the rotatably mounted tube.

DETAILED DESCRIPTION OF THE PREFERRED EMBODIMENT

The screw conveyor shown as a whole in FIG. 1 has as essential components a screw 2 driven by a gear 1 and mounted at one end in a bearing, not shown, so that it lies on a horizontal axis, a fixed tube 3 surrounding the screw 2 coaxially its entire length and provided with a filling opening 3a, and a funnel 4 serving to load the material to be conveyed through filling opening 3a where tube 3 passes through funnel 4 (not shown in FIG. 1). The screw conveys the loose material from funnel 4 to open end 3b of fixed tube 3 at a constant rotational speed and at a constant rate of delivery.

When the amount to be conveyed is small, small piles of loose material of a constant size form between the individual threads, so that, as is known for screw conveyors of this kind, material is not dispensed at a constant rate over time from discharge end 3b, but in a quantity that fluctuates periodically as a function of time.

To avoid this disadvantage, i.e. for the purpose of using a screw conveyor of this kind not only for ordinary metering but also for precision metering, i.e. for dispensing very small amounts of material at a rate that is constant over time, on the order of 1 g/min or less, discharge end 3b of fixed tube 3 is surrounded by a tube 5 rotatably mounted, by a ball bearing 7, on fixed tube 3. It is provided with a cross pin 6 traversing a slot 2a provided at the free end of screw 2. In this manner, which represents a very simple design in itself, assurance is provided that rotatably mounted tube 5, open at one end, turns at the same rotational speed as screw 2.

Of course, it would also be possible to drive the tube externally. In other words, to provide it with a crown gear for example, and drive it using the same motor used to drive gear 1 rigidly connected to screw 2, so that the rotational speed of tube 5 is proportional to the rotational speed of screw 2.

The loose material, conveyed through screw 2 with a very precise periodicity whose duration corresponds to the duration of one screw revolution, from fixed tube 3 into rotatably mounted tube 5, is now surprisingly distributed by the rotating tube in such fashion that it emerges from this rotatably mounted tube 5 with a very high degree of uniformity, i.e. without periodic fluctuations.

This rotatably mounted tube need not necessarily have a precisely cylindrical inner surface, such as shown in FIGS. 1 and 4. It can also, as shown in FIG. 5, have an end segment with a diameter that increases toward the end, i.e. an inner surface 5a that expands conically outward. It is also possible to have the inside diameter of end segment 5b decrease constantly toward the open end, either up to dispensing edge 5c, as shown in FIG. 6, or so that it abuts section 5d with a decreasing inside diameter with another segment 5e with an increasing inside diameter, as shown in FIG. 7.

The drawings show the inner surface of rotatably mounted tube 5 as completely smooth. This inner surface can also be provided with a grooved surface, either completely or at least in the vicinity of the discharge end of fixed tube 3. This grooved surface can consist of, for example, intersecting grooves that combine to form a knurled surface 5f. The grooved surface can also be formed by one or more helical grooves 5g arranged so that they convey loose material that has fallen into them, from fixed tube 3, in the direction opposite to the transport direction of screw 2. This permits extremely high uniformity of loose material dispensing even at very low conveyor speeds.

What is claimed is:

1. A screw conveyor with a feed screw rotatably mounted in a fixed tube provided with a filling opening, comprising:

a tube rotatably mounted at a discharge end of the fixed tube, said rotatably mounted tube driven at a rotational speed proportional to a rotational speed of the feed screw, the feed screw having a substantially horizontal axis.

2. The screw conveyor according to claim 1, wherein said rotatably mounted tube is nonrotatably connected to the feed screw.

3. The screw conveyor according to claim 1, wherein said rotatably mounted tube has a cylindrical inner surface.

4. The screw conveyor according to claim 1, wherein an inside diameter of said rotatably mounted tube increases toward an open end.

5. The screw conveyor according to claim 1, wherein an inside diameter of said rotatably mounted tube decreases toward an open end.

6. The screw conveyor according to claim 5, wherein said inside diameter of said rotatably mounted tube after decreasing in a first segment increases in a last segment before the open end.

7. The screw conveyor according to claim 1, wherein an inner surface of said rotatably mounted tube has a grooved surface at least in a vicinity of the discharge end of the fixed tube.

8. The screw conveyor according to claim 7, wherein said grooved surface is a knurled surface.

9. The screw conveyor according to claim 7, wherein said grooved surface comprises at least one helical groove running such that loose material falling into said helical groove is conveyed opposite to the feed direction of the feed screw.

10. The screw conveyor according to claim 2, wherein said rotatably mounted tube has a cylindrical inner surface.

11. The screw conveyor according to claim 2, wherein an inside diameter of said rotatably mounted tube increases toward an open end.

12. The screw conveyor according to claim 2, wherein an inside diameter of said rotatably mounted tube decreases toward an open end.

13. The screw conveyor according to claim 12, wherein said inside diameter of said rotatably mounted tube after decreasing in a first segment increases in a last segment before the open end.

14. The screw conveyor according to claim 1, wherein said substantially horizontal axis has an angle of inclination from horizontal that is no greater than 30°.

* * * * *